(12) United States Patent
Toner

(10) Patent No.: US 9,888,103 B2
(45) Date of Patent: Feb. 6, 2018

(54) DEVICE STAND WITH INTEGRAL CRADLE PORT

(71) Applicant: John Toner, Tampa, FL (US)

(72) Inventor: John Toner, Tampa, FL (US)

( * ) Notice: Subject to any disclaimer, the term of this patent is extended or adjusted under 35 U.S.C. 154(b) by 0 days.

(21) Appl. No.: 15/227,606

(22) Filed: Aug. 3, 2016

(65) Prior Publication Data

US 2017/0163779 A1 Jun. 8, 2017

Related U.S. Application Data

(60) Provisional application No. 62/262,746, filed on Dec. 3, 2015.

(51) Int. Cl.
*H04M 1/04* (2006.01)
*G06F 1/16* (2006.01)
*H04M 1/02* (2006.01)
*H04M 1/725* (2006.01)

(52) U.S. Cl.
CPC ............ *H04M 1/04* (2013.01); *G06F 1/1632* (2013.01); *H04M 1/0254* (2013.01); *H04M 1/0258* (2013.01); *H04M 1/72527* (2013.01); *H04M 2250/18* (2013.01)

(58) Field of Classification Search
CPC ...... H04M 1/04; H04M 1/0254; G06F 1/1632
See application file for complete search history.

(56) References Cited

U.S. PATENT DOCUMENTS

| 6,762,585 | B2 * | 7/2004 | Liao | H02J 7/0044 320/107 |
| 8,897,033 | B2 | 11/2014 | Slipy | |
| 2006/0237623 | A1 * | 10/2006 | Sung | F16M 11/10 248/688 |
| 2010/0309617 | A1 | 12/2010 | Wang | |
| 2011/0051329 | A1 | 3/2011 | Huang | |
| 2011/0164358 | A1 | 7/2011 | Duan | |
| 2013/0094687 | A1 * | 4/2013 | Weinstein | H04R 1/10 381/334 |
| 2014/0202887 | A1 | 7/2014 | Mongan | |

* cited by examiner

*Primary Examiner* — Tuan H Nguyen
(74) *Attorney, Agent, or Firm* — Larson & Larson, P.A.; Frank Liebenow

(57) ABSTRACT

A stand for supporting a device such as a cellphone or tablet computer includes a body section for physically connecting to the device. The body section has one or more legs. The legs have at least two positions; a first position flush with the body section and a second position extended for supporting the device at an angle with respect to a surface on which the device and stand rest. A power input for connecting to a source of power is provided on the body. A device connector is electrically coupled to the power input and electrically connected to the device, thereby providing electrical power to the device. A docking port is formed in the body section. The docking port accepts and holds a peripheral device and has a docking port connector for providing power to the peripheral device.

20 Claims, 8 Drawing Sheets

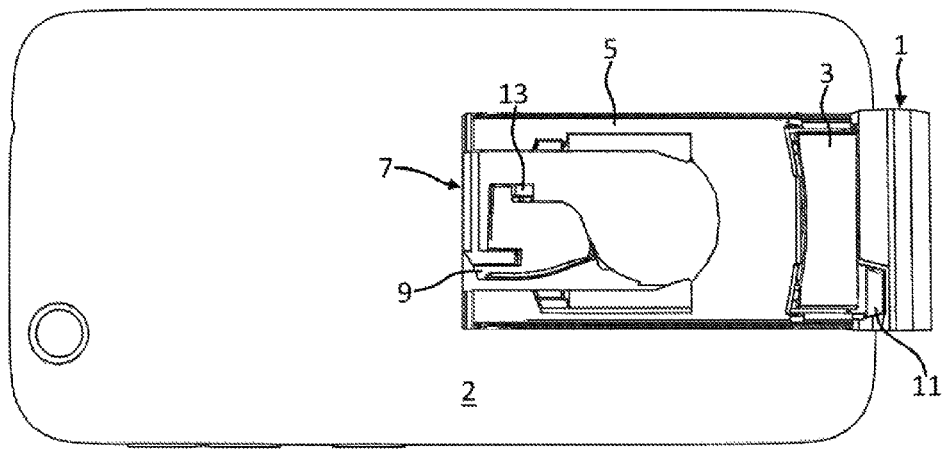
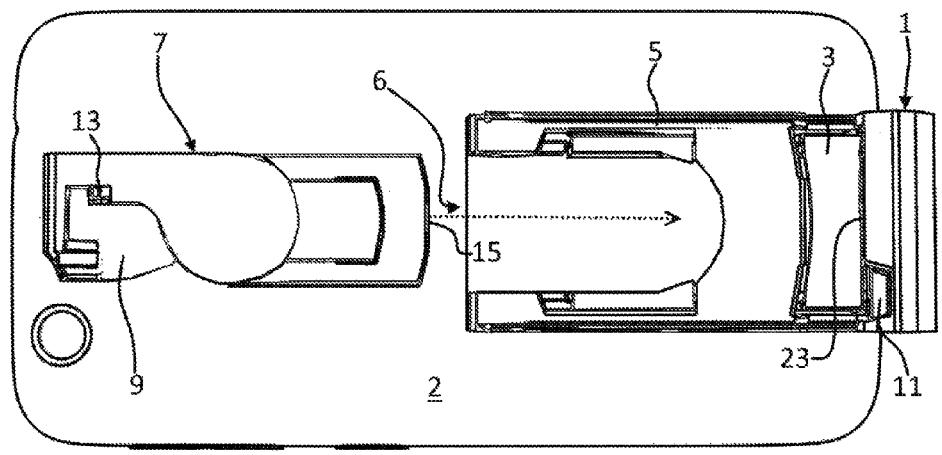
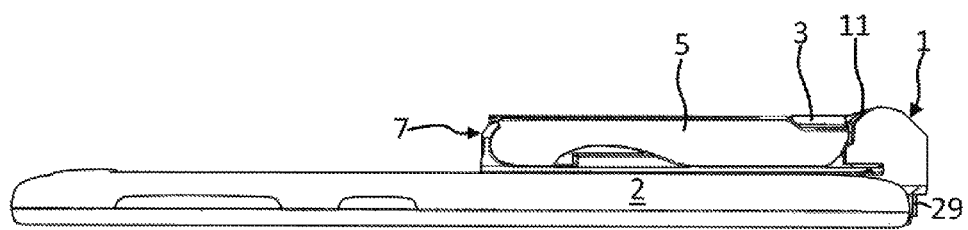

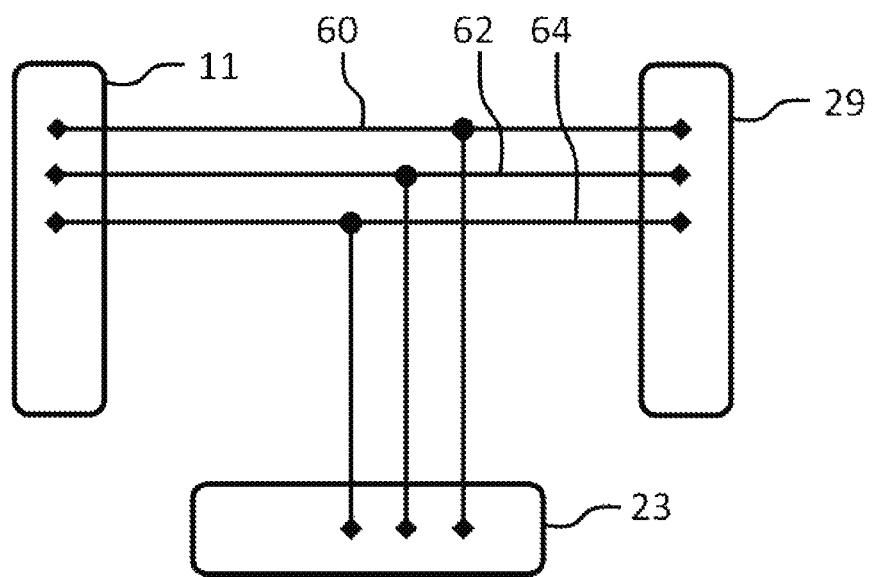

DEVICE STAND WITH INTEGRAL CRADLE PORT

CROSS-REFERENCE TO RELATED APPLICATION

This application claims the benefit of U.S. provisional application No. 62/262,746 filed on Dec. 3, 2015, the disclosure of which is incorporated by reference.

FIELD

This invention relates to the field of stands for devices such as cellphones and tablet computers and more particularly to a stand provided in an external case or a stand that affixes to the back of one such device.

BACKGROUND

Devices such as cellphones and tablet computers are generally planar in nature, having a thickness of around ¼ of an inch. Such devices are generally held when used or placed in a stand to prop up the device for extended viewing or for use with an external keyboard.

Many users enjoy videos, music, movies, etc., on such devices. For this, and many other anticipated uses, it is useful to have a stand to support such devices at an angle with respect to a surface; as it is difficult to view such devices when the device lay flat on the surface.

Further, there is a range of peripherals that are used in conjunction with such devices. For example, many use a wireless headset coupled to their cellphone to use the cellphone without a need to hold the cellphone to one's ear. Many small-sized peripherals are often used with cellphones and tablet computers, for example, small keyboards, miniature projectors, miniature keyboard projection devices, specialized radios, auxiliary wireless speakers, etc. Being that such peripherals are usually very small, they are easily misplaced. Further, such peripherals typically require charging, utilizing a different charger than the cellphone or tablet computers.

What is needed is a stand that will provide a docking port for a peripheral device and provide for charging of the peripheral device.

SUMMARY

In one embodiment, a stand for supporting a device such as a cellphone or tablet computer is disclosed. The stand includes a body section for physically connecting to the device. The body section has one or more legs. The legs have at least two positions; a first position flush with the body section and a second position extended for supporting the device at an angle with respect to a surface on which the device and stand rest. A power input for connecting to a source of power is provided on the body. A device connector is electrically coupled to the power input and electrically connected to the device, thereby providing electrical power to the device. A docking port is formed in the body section. The docking port accepts and holds a peripheral device and has a docking port connector for providing power to the peripheral device.

In another embodiment, a stand is disclosed including a body section for physically connecting to a back surface of a device. One or more legs are connected to the body section. The legs have at least two positions: a first position flush with the body section and a second position extended from the body section for supporting the device at an angle with respect to a surface on which the device and stand rest. A power input is provided on the body section for connecting to a source of power and as well as a device connector that is electrically coupled to the power input and electrically connected to the device, thereby providing electrical power to the device. A docking port is formed in the body section for accepting and holding a peripheral device. The docking port has a docking port connector for providing power to the peripheral device.

In another embodiment, a stand for supporting a cellphone is disclosed including a cellphone case that includes on a back surface a body section of the stand. One or more legs are interfaced to the body section. The legs having at least two positions: a first position flush with the body section and a second position extended from the body for supporting the device at an angle with respect to a surface on which the device and stand rest. The stand has a power input for connecting to a source of power and a device connector which is electrically coupled to the power input. A docking port is formed in the body section for accepting and holding a peripheral device. The docking port has a docking port connector for providing power to the peripheral device.

BRIEF DESCRIPTION OF THE DRAWINGS

The invention can be best understood by those having ordinary skill in the art by reference to the following detailed description when considered in conjunction with the accompanying drawings in which:

FIG. 1 illustrates a plan view of a device (cellphone) having there attached a stand with a docking port, the docking port occupied by an exemplary peripheral device, being a wireless headset.

FIG. 2 illustrates a plan view of the device (cellphone) having there attached the stand with the docking port, the exemplary peripheral device (wireless headset) moved out of the docking port.

FIG. 3 illustrates an elevational view of the device (cellphone) having there attached the stand with the docking port, the docking port occupied by the exemplary peripheral device (wireless headset).

FIG. 17 illustrates a schematic view of connections within the stand.

DETAILED DESCRIPTION

Figure 4:
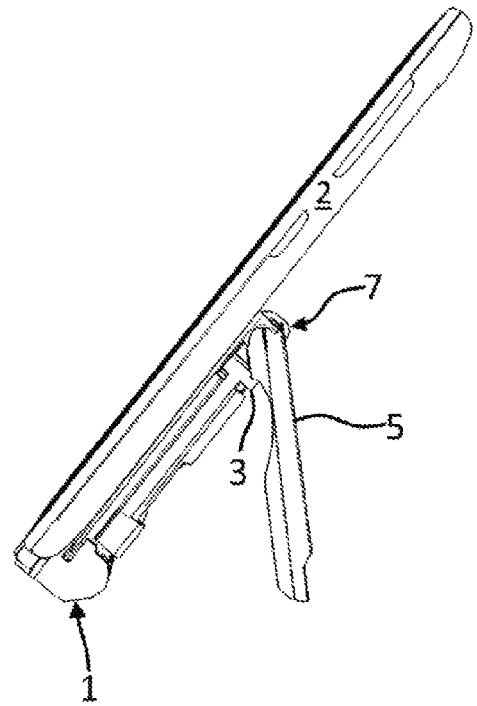
FIG. 4 illustrates a side, perspective view of the device (cellphone) having there attached the stand with the docking port, the docking port occupied by the exemplary peripheral device (wireless headset), and legs of the stand being deployed to support the device in an elevated, angular position.

Reference will now be made in detail to the presently preferred embodiments of the invention, examples of which are illustrated in the accompanying drawings. Throughout the following detailed description, the same reference numerals refer to the same elements in all figures.

Throughout this description, exemplary devices and peripherals are used for demonstrative purposes and in no way limit the present invention to any particular device or peripheral. In general, a cellular phone is used as an example of such devices. Likewise, two exemplary peripherals are used for clarity, a wireless headset and a wireless keyboard, though there is no limit as to the types of peripherals anticipated. Examples of other peripherals include, but are not limited to, a rechargeable flashlight, an external speaker, a radio device, specialized electronics, a wireless mouse, an auxiliary battery, a gaming device, ear-buds, etc. Although charging is provided from the docking port, it is anticipated that both powered devices and non-powered devices be used in the docking port.

Referring to FIGS. 1-3, views of a cellphone 2 having there attached a stand 1 with a docking port 6, the docking port 6 occupied by an exemplary peripheral device, being a wireless headset 7 in the example shown in FIGS. 1-3. In FIGS. 1-3, the legs 5 are not deployed and the stand 1 is in its thinnest configuration. In this embodiment, the stand 1 is attached to the cellphone 2 by, for example, an adhesive such as double-sided tape, or any type of adhesive. In some embodiments, the stand 1 is attached to the device (e.g. cellphone 2) by suction cups or other non-adhesive devices. It is anticipated that the method of attaching the stand 1 to the device (cellphone 2) is robust enough so as the stand 1 will not separate from the device (cellphone 2) during normal use, but in some circumstances, the stand 1 is removable from the device (cellphone 2) by prying or using a material that neutralizes the adhesive properties of the adhesive.

The stand 1 has an input power connector 11 for receiving power from an external power source such as a wall wart or computer, etc. In one embodiment, the stand 1 provides power to a peripheral (e.g., headset 7) through a peripheral connector 23 that interfaced with a mating connector 15 on the peripheral (e.g., headset 7) to provide power to the peripheral (e.g., headset 7), for example, to charge the peripheral (e.g., headset 7). In alternate embodiments, the stand 1 provides power to the peripheral (e.g., headset 7) through a wireless interface (not shown) such as a magnetic power transfer device.

By providing power to both the peripheral (e.g., headset 7) and the device (e.g., cellphone 2) by connecting the stand 1 to a single source of power (not shown), power is provided to charge and/or power both the device (e.g., cellphone 2) and the peripheral (e.g., headset 7), eliminating the need for two different power sources, cables, etc.

To charge both the device (e.g., cellphone 2) and the peripheral (e.g., headset 7), a source of power (e.g. a wall wart) is connected to the power connector 11 through an appropriate cable (e.g. a cable having a connector that mates with the input power connector 11). Internal to the stand 1, power 60 and ground 62 (see FIG. 17) are routed to a charging connector 29 that connects with an existing device power connector 27 (see FIG. 15) of the cellphone 2 when the stand 1 is affixed to the cellphone 2. Power 60 and ground 62 are also routed to a peripheral connector 23 that connects with a peripheral (e.g. a headset 7) when the peripheral (e.g. headset 7) is inserted into the docking port 6.

It is anticipated that, at a minimum, connections for providing power 60 and ground 62 are made between the input power connector 11, the charging connector 29 (e.g. to connect with the cellphone 2), and the peripheral connector 23, providing power to the device (cellphone 2) and the peripheral (e.g. headset 7). In some embodiments, other pins in the input power connector 11 are also routed to the charging connector 29 and/or to the peripheral connector 23, providing, for example, data connections 64, as in some uses, the source of power is a computing system which provides for data exchange with, for example, the device (cellphone 2) and/or the peripheral (e.g. headset 7).

Figure 5:
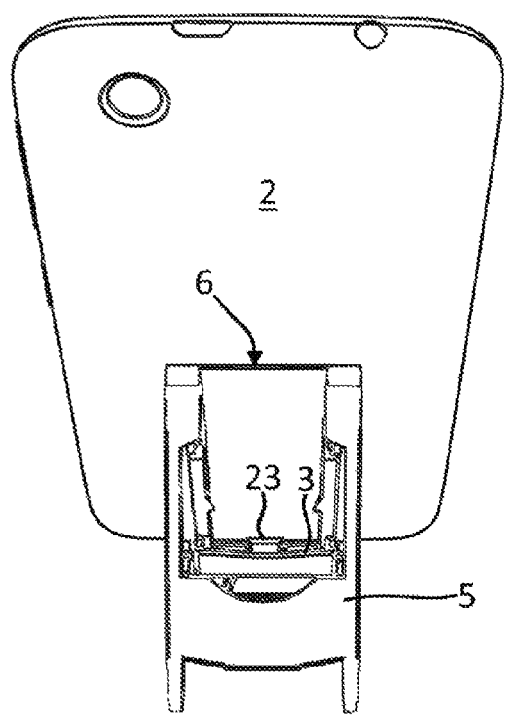
FIG. 5 illustrates a rear perspective view of the device (cellphone) having there attached the stand with the docking port and the legs of the stand ate deployed to support the device in an elevated position.

Referring to FIGS. 4 and 5 elevational views of the device (cellphone 2) are shown having there attached the stand 1 with the docking port 6. In this example, the legs 5 of the stand 1 are deployed to support the device (e.g. cellphone 2) in an elevated position.

Although two legs 5 are shown, any number of legs 5 are anticipated, preferably one or two legs 5. The legs 5 are maintained in one or more deployed positions by a locking mechanism 3 such as having a protrusion on one or more sides of the legs 5 and having one or more depressions on a neighboring surface of the body of the stand 1, e.g., a detent mechanism. As the legs 5 are rotated into a deployed position, the locking mechanisms 3 (e.g. detents) maintain the legs 5 in the desired position, providing sufficient resistance to closing of the legs 5 so as to support the device (e.g. cellphone 2) at the desired angle so as to be able to view the device (e.g. cellphone 2) without holding the device (e.g. cellphone 2). Note that such leg locking mechanisms 3 are known in the art and there are many ways to lock legs 5 at a given extended position or variable extended position, including ratchet mechanisms, thumb screw mechanism, etc., all of which are fully anticipated.

Figure 6:
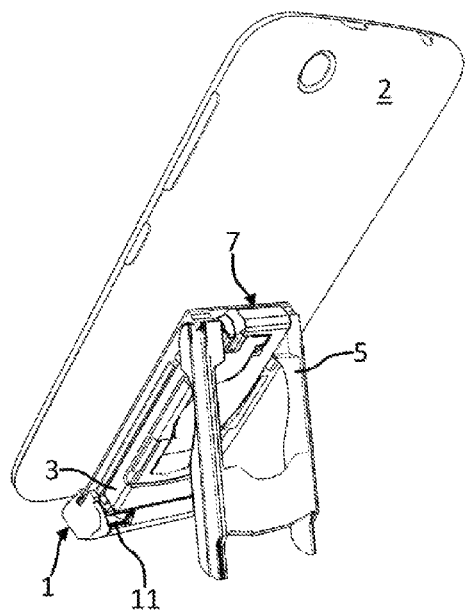
FIG. 6 illustrates a second rear perspective view of the device (cellphone) having there attached the stand with the docking port and the legs of the stand being deployed to support the device in an elevated position.
Figure 7:
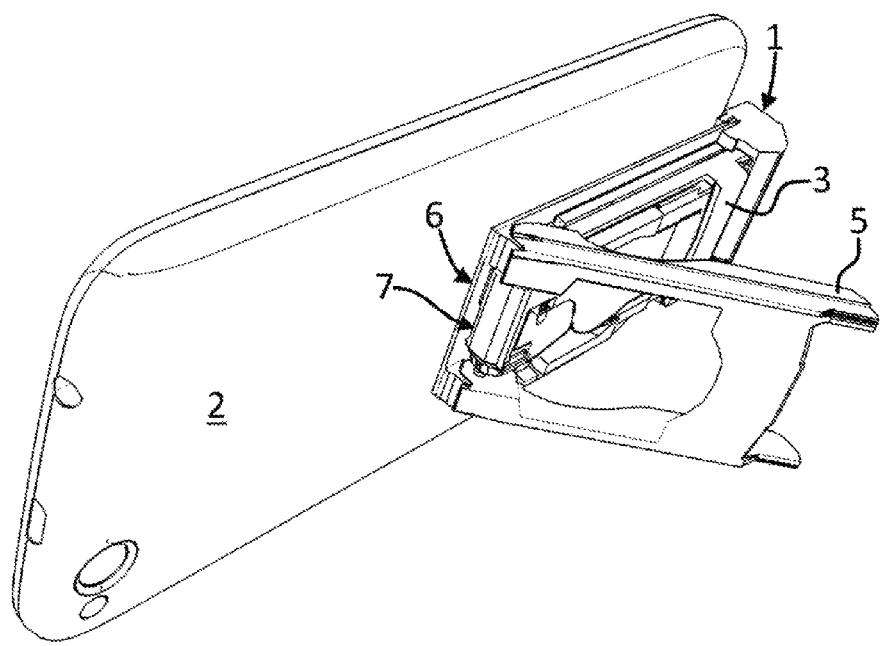
FIG. 7 illustrates a third rear perspective view of the device (cellphone) having there attached the stand with the docking port, the docking port occupied by the exemplary peripheral device (wireless headset), and legs of the stand being deployed to support the device in an elevated position.

Referring to FIG. 6 a second rear perspective view of the device (cellphone 2) having there attached the stand 1 with the docking port 6, the docking port 6 occupied by the exemplary peripheral device (wireless headset 7), and legs 5 of the stand 1 being deployed to support the device (cellphone 2) in an elevated position. In this view, the device (cellphone 2) is held elevated in a portrait mode, perhaps for reading email, etc.

Referring to FIG. 6 a third rear perspective view of the device (cellphone 2) having there attached the stand 1 with the docking port 6, the docking port 6 occupied by the exemplary peripheral device (wireless headset 7), and legs 5 of the stand 1 being deployed to support the device (cellphone 2) in an elevated position. In this view, the device (cellphone 2) is held elevated lengthwise so that the display (not visible) of the device (cellphone 2) is a landscape mode, perhaps for watching a video, etc.

Figure 8:
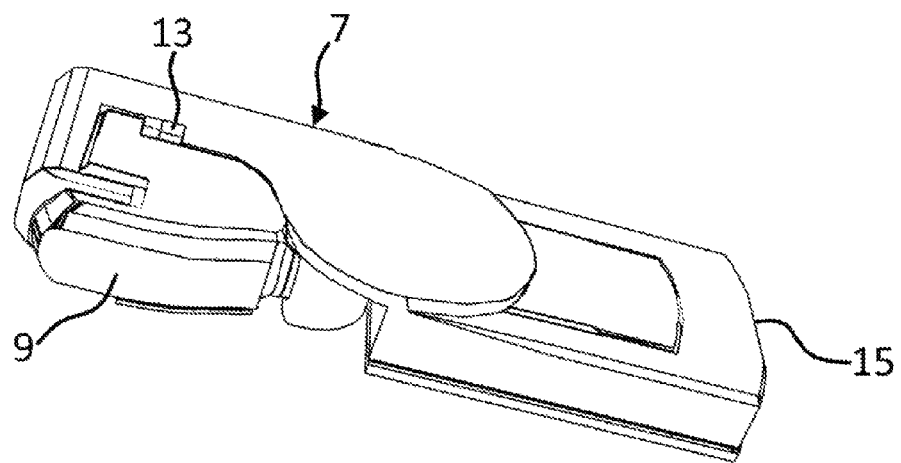
FIG. 8 illustrates a perspective view of the exemplary peripheral device (wireless headset) with an earplug that is not deployed.
Figure 9:
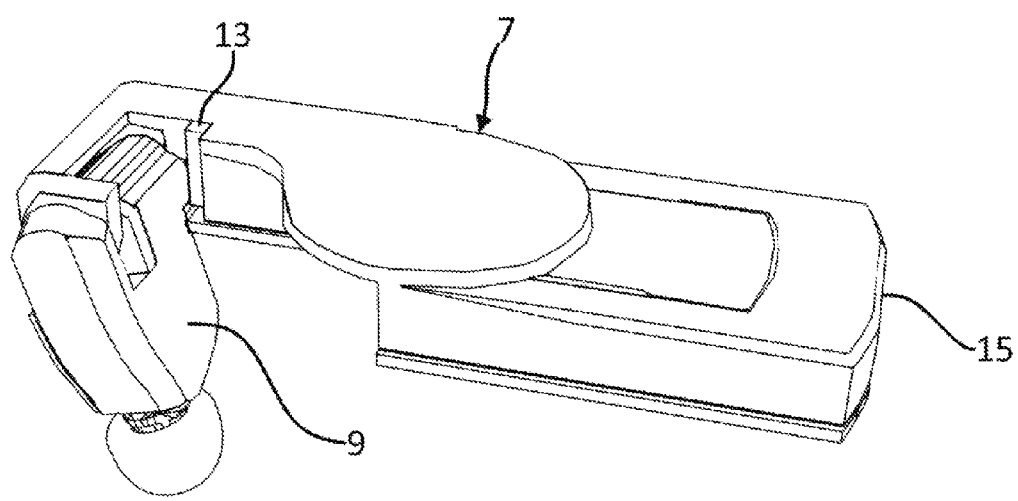
FIG. 9 illustrates a perspective view of the exemplary peripheral device (wireless headset) with the earplug deployed.

Referring to FIGS. 8 and 9, perspective views of the exemplary peripheral device (wireless headset 7) are shown with an ear bud 9 that is not deployed (FIG. 8) or an ear bud 9 that is deployed (FIG. 9). To facilitate a smaller size, in the embodiment shown, the wireless headset 7 includes an ear bud 9 that collapses into the case of the wireless headset 7 when the wireless headset 7 is inserted into the docking port 6. To use the wireless headset 7, the ear bud 9 is gently pulled to rotate the ear bud 9, overcoming resistance of the latch 13, to extend the ear bud 9 out of the case of the wireless headset 7 for insertion into a user's ear (not shown) when in use. When the user desires to replace the wireless headset 7 back into the docking port 6, the user pushes the ear bud 9 back into the case, where it is locked in place by a latch 13.

Figure 10:
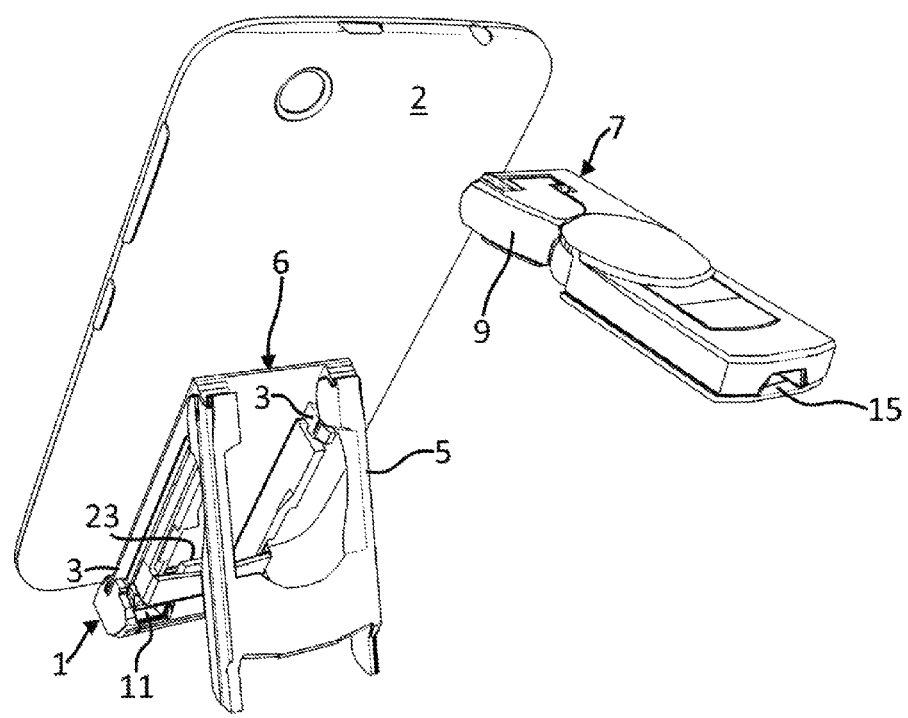
FIG. 10 illustrates a perspective view of the exemplary peripheral device (wireless headset) with the earplug not deployed, ready to be inserted into the docking port.

Referring to FIG. 10, a perspective view of the exemplary peripheral device (wireless headset 7) with the ear bud 9 not deployed, ready to be inserted into the docking port 6 is shown. In this view, the legs 5 are deployed, holding the device (e.g. cellphone 2) at a viewing angle. It is anticipated that the peripheral device (e.g. wireless headset 7) is able to be inserted into the docking port 6 when the legs 5 are extended and when the legs 5 are retracted (as in FIGS. 1-3).

Figure 11:
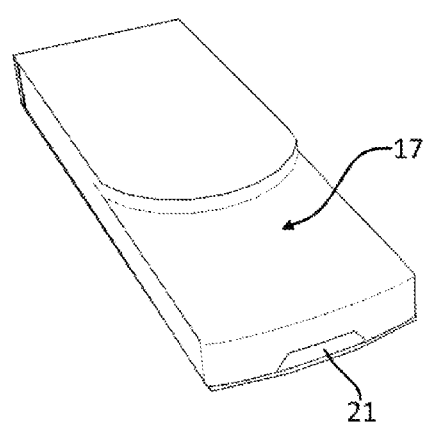
FIG. 11 illustrates a rear perspective view of a second exemplary peripheral device (keyboard).
Figure 12:
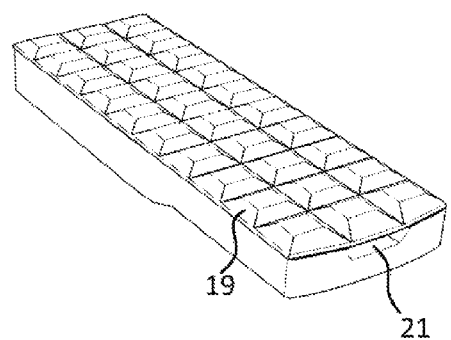
FIG. 12 illustrates a front perspective view of a second exemplary peripheral device (keyboard).

Referring to FIGS. 11 and 12, a rear perspective view (FIG. 11) and a front perspective view (FIG. 12) of a second exemplary peripheral device (keyboard) 17 are shown. As discussed prior, many different peripheral devices are anticipated and the keyboard 17 is but another example of a peripheral device. The keyboard includes at least one key 19 and a keyboard connector 21 that interfaces with the peripheral connector 23 to provide power to the keyboard 17 when the keyboard 17 is inserted into the docking port 6, for example, to charge an internal battery within the keyboard 17.

Figure 13:
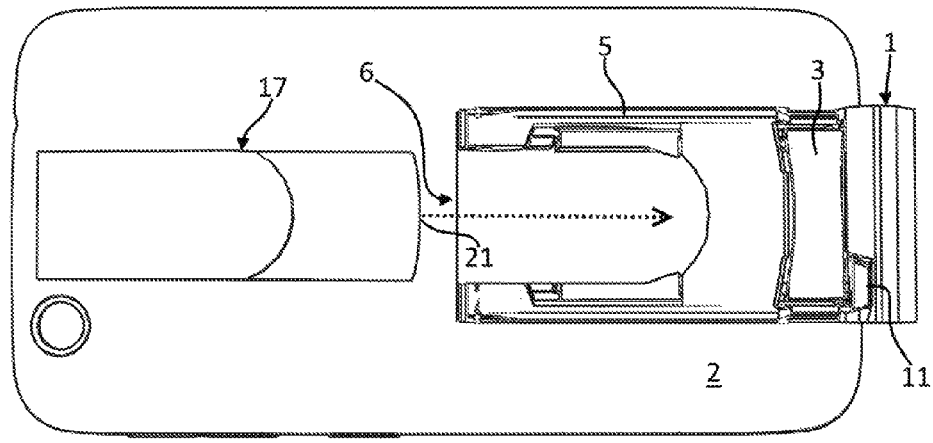
FIG. 13 illustrates a plan view of the device (cellphone) having there attached the stand with the docking port, the second exemplary peripheral device (keyboard) being inserted into the docking port.

Referring to FIG. 13 illustrates a plan view of the device (cellphone 2) having there attached the stand 1 with the docking port 6, the second exemplary peripheral device (keyboard 17) being inserted into the docking port is shown.

Figure 14:
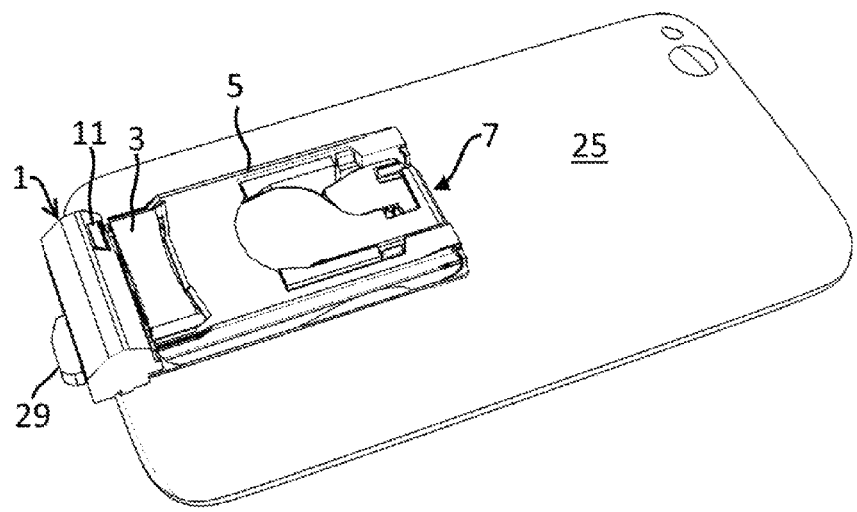
FIG. 14 illustrates a perspective view of a device case having there integrated a stand with a docking port, the docking port occupied by an exemplary peripheral device, being a wireless headset.
Figure 15:
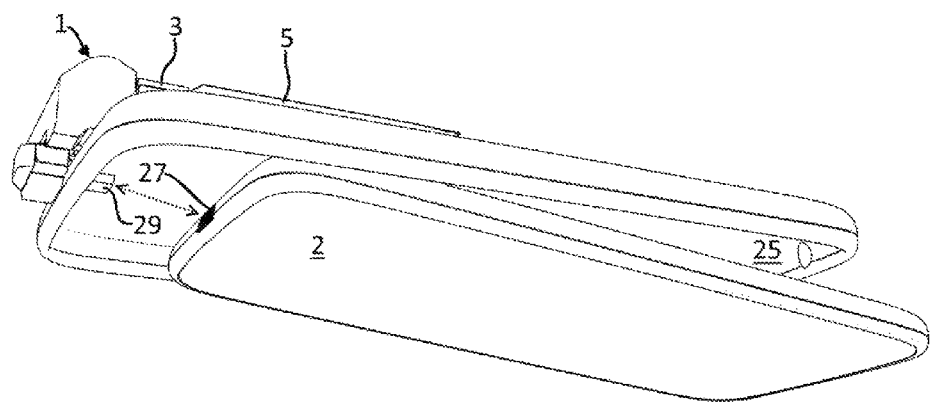
FIG. 15 illustrates a perspective view of a cellular phone being inserted into the device case having there integrated a stand with a docking port, the docking port occupied by an exemplary peripheral device, being a wireless headset.

Referring to FIGS. 14 and 15, a perspective view of a cellphone case 25 having an integrated stand 1 with a docking port 6 (FIG. 14) and of a cellphone 2 being inserted into the cellphone case 25 (FIG. 15) are shown. The docking port 6 is occupied by an exemplary peripheral device, being a wireless headset 7 in this example. As the previous examples showed the stand 1 directly affixed to the device (e.g. cellphone 2), many people prefer to enclose their cellphone 2 with a case for providing custom colors and/or additional protection to the cellphone 2. Since it would be difficult to attach a case to a cellphone 2 after the stand 1 is affixed to the cellphone 2, in the embodiments shown in FIGS. 14 and 15, the case 1 is affixed or constructed as part of the cellphone case 25. The consumer would purchase the cellphone case 25, then, as shown in FIG. 15, slide the cellphone 2 into the cellphone case 25, at the same time, connecting the device power connector 27 of the cellphone 2 to the charging connector 29 of the stand 1. This will provide power and/or data connection between the stand 1 (part of the cellphone case 25) when power is provided to the stand 1 through the input power connector 11 as previously discussed. The operation of the docking port 6 is the same as previously described.

Figure 16:
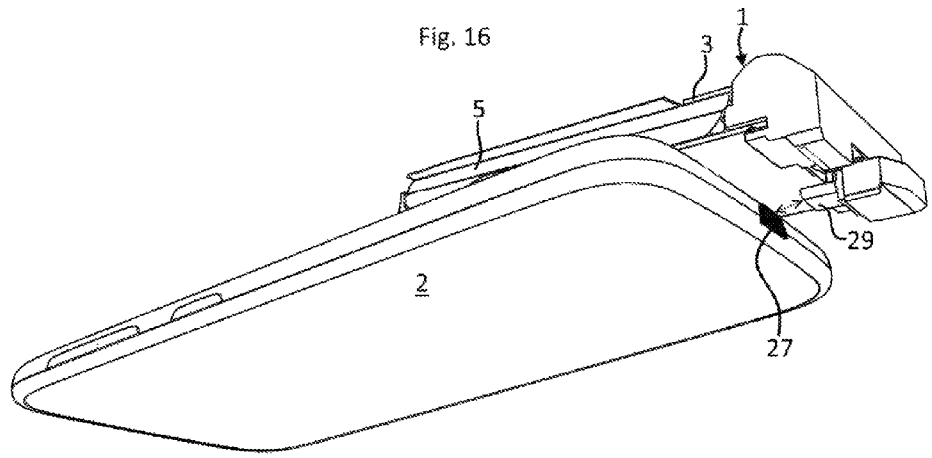
FIG. 16 illustrates a perspective view of a stand in the process of being attached to a cellular phone.

Referring to FIG. 16, a perspective view of a stand 1 in the process of being attached to a cellphone 2 is shown. This shows how the charging connector 29 of the stand 1 inserts into the device power connector 27 of the cellphone 2 as the stand 1 is attached to the cellphone 2. This will provide power and/or data connection between the stand 1 when power is provided to the stand 1 through the input power connector 11 as previously discussed. Note that in this example, the charging connector 29 is male and the device power connector 27 of the cellphone 2 is female, but there is no limitation as to the type of connectors or orientation of connectors.

Referring to FIG. 17, a schematic view of internal connections between the connectors 11/27/29 of the stand 1 are shown. As stated prior, it is anticipated that power be connected between the connectors 11/27/29, as accomplished in FIG. 17 with power 60 and ground 62 connections between the input power connector 11, the charging connector 29, and the device power connector 27. As discussed, in some embodiments, one or more pins of the connectors 11/27/29 are connected to provide data connections (e.g. Universal Serial Bus—USB) for data transmission to/from the device and/or the peripheral and/or the source of power (e.g. computer—not shown). In the example, a single data connection 64 is shown between all connectors 11/27/29, though it is anticipated that as many connections as needed between any pair of connectors 11/27/29 or all connectors 11/27/29 is made.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A stand for supporting a cellphone or tablet computer, the stand comprising:
    a body section for physically connecting to the cellphone;
    one or more legs interfaced to the body section, the legs having at least two positions, a first position flush with the body section and a second position extended for supporting the cellphone at an angle with respect to a surface on which the cellphone and stand rest;
    an input power connector physically held by the body section, the input power connector receiving electrical power from a source of power;
    a cellphone connector on the body section, the cellphone connector electrically coupled to the input power connector and electrically connected to the cellphone, thereby providing the electrical power to the cellphone; and
    a docking port formed in the body section, the docking port for accepting and holding a peripheral device, the docking port having a docking port connector that is electrically coupled to the input power connector for providing the electrical power to the peripheral device.

2. The stand of claim 1, wherein the input power connector further comprises a data connection and the data connection is electrically connected to the cellphone connector for providing communications between the source of power and the cellphone.

3. The stand of claim 2, wherein the data connection is electrically connected to the docking port connector for providing communications between the source of power and the peripheral device.

4. The stand of claim 1, wherein the peripheral device is a wireless headset.

5. The stand of claim 1, wherein the peripheral device is a wireless headset having a connector that mates with the docking port connector when the wireless headset is inserted into the docking port for providing the electrical power to the wireless headset for charging.

6. The stand of claim 1, wherein the peripheral device is a keyboard.

7. The stand of claim 1, wherein the peripheral device is a keyboard having a connector that mates with the docking port connector when the keyboard is inserted into the docking port for providing the electrical power to the keyboard for charging.

8. The stand of claim 1, whereas the body of the stand is affixed to a back surface of the cellphone.

9. The stand of claim 1, whereas the body of the stand is affixed to or is a formed as part of a back surface of a case into which the cellphone is inserted.

10. The stand of claim 1, wherein the input power connector connects to a cable, the cable being connected to the source of the electrical power.

11. A stand comprising:
a body section physically connected to a back surface of a cellphone;
one or more legs interfaced to the body section, the legs having at least two positions, a first position flush with the body section and a second position extended for supporting the cellphone at an angle with respect to a surface on which the cellphone and stand rest;
an input power connector on the body section, the input power connector for connecting to an external source of electrical power;
a cellphone connector on the body section, the cellphone connector electrically coupled to the input power connector for receiving the electrical power from the external source of power, and the cellphone connector electrically connected to the cellphone, thereby providing the electrical power to the cellphone; and
a docking port formed in the body section, the docking port for accepting and holding a peripheral device, the docking port having a docking port connector that is electrically coupled to the input power connector for providing the electrical power to the peripheral device.

12. The stand of claim 11, wherein the input power connector further comprises a data connection and the data connection is electrically connected to the cellphone connector for providing communications between the source of power and the cellphone.

13. The stand of claim 11, wherein the peripheral device has a connector that mates with the docking port connector when the peripheral is inserted into the docking port for providing the electrical power to the peripheral device for charging.

14. A stand for supporting a cellphone, the stand comprising:
a cellphone case that includes on a back surface of the cellphone case, a body section of the stand;
one or more legs movably affixed to the body section, the legs having at least two positions, a first position flush with the body section and a second position extended for supporting the cellphone case at an angle with respect to a surface on which the cellphone case and stand rest;
an input power connector on the body section, the input power connector for connecting to an external source of electrical power;
a cellphone connector on the body section, the device connector electrically coupled to the input power connector, the cellphone connector for providing the electrical power to the cellphone when the input power connector is connected to the external source of the electrical power and when the cellphone is held by the cellphone case; and
a docking port in the body section, the docking port for accepting and holding a peripheral device, the docking port having a docking port connector that is electrically coupled to the input power connector for providing the electrical power to the peripheral device.

15. The stand of claim 14, wherein the input power connector further comprises a data connection and the data connection is electrically connected to the cellphone connector for providing communications between the source of the electrical power and the cellphone.

16. The stand of claim 14, wherein the peripheral device is a wireless headset.

17. The stand of claim 14, wherein the peripheral device is a wireless headset having a connector that mates with the docking port connector when the wireless headset is inserted into the docking port for providing the electrical power to the wireless headset for charging.

18. The stand of claim 14, wherein the peripheral device is a keyboard.

19. The stand of claim 14, wherein the peripheral device is a keyboard having a connector that mates with the docking port connector when the keyboard is inserted into the docking port for providing the electrical power to the keyboard for charging.

20. The stand of claim 14, whereas a power connector of the cellphone connects with the cellphone connector when the cellphone case is installed onto the cellphone, thereby providing the electrical power to the cellphone when the cellphone case is installed onto the cellphone and when the external source of the electrical power is connected to the input power connector.

* * * * *